United States Patent

[11] 3,627,731

| [72] | Inventors | Diana M. Curcio<br>Blawnox, Pa.;<br>John M. Jarvie, Wilbraham, Mass. |
| --- | --- | --- |
| [21] | Appl. No. | 824,309 |
| [22] | Filed | May 13, 1969 |
| [45] | Patented | Dec. 14, 1971 |
| [73] | Assignee | Gulf Research & Development Company<br>Pittsburgh, Pa. |

[54] REACTION OF POLYMETHYLBENZENES AND CARBON TETRACHLORIDE
2 Claims, No Drawings

[52] U.S. Cl. .................................................... 260/651 R, 260/670
[51] Int. Cl. ...................................................... C07c 25/14
[50] Field of Search .......................................... 260/651

[56] References Cited
UNITED STATES PATENTS

| 1,733,268 | 10/1929 | Kyrides | 260/651 |
| --- | --- | --- | --- |
| 3,190,825 | 6/1965 | Huyser | 260/651 X |

FOREIGN PATENTS

| 4,327,212 | 11/1968 | Japan | 260/651 |
| --- | --- | --- | --- |

OTHER REFERENCES

Oldekop, Doklady Akad Nauk SSSR 93, 75– 76 (1953)
Oldekop, Chem. Sbstr. 48 6,977
Oldekop et al., Zhur, Obschei Khim, 30, 3,358– 3,361 (1960)

Primary Examiner—Howard T. Mars
Attorneys—Meyer Neishloss, Deane E. Keith and Donald L. Rose

ABSTRACT: This disclosure concerns the process of reacting carbon tetrachloride with polymethylbenzenes at a temperature above about 270°C. $\alpha$-chloroparaxylene is prepared from paraxylene.

REACTION OF POLYMETHYLBENZENES AND CARBON TETRACHLORIDE

This invention relates to a novel process for producing monochlorinated polymethylbenzenes, dichlorinated polymethylbenzenes, and other products by reacting carbon tetrachloride with polymethylbenzenes at a temperature of at least about 270° C. Polymethylbenzenes include the xylenes, mesitylene, pseudocumene, durene, pentamethyl benzene, hexamethyl benzene, etc.

The reaction of carbon tetrachloride with various hydrocarbons such as the aliphatic and phenyl-substituted aliphatic hydrocarbons is known. Reaction initiators such as organic peroxides and electromagnetic radiation have been used for this type of reaction. However, since a mixture of components is generally produced with low overall yield and selectivity to any one compound, the reaction of carbon tetrachloride with hydrocarbons such as polymethylbenzenes has not been regarded as a satisfactory method for producing any single product.

We have surprisingly discovered that carbon tetrachloride can be reacted with polymethylbenzenes at conditions that will result in excellent selectively and good yield to a major product. Thus, in our process, a selectivity to $\alpha$-chloroparaxylene, for example, as high as 90 percent and higher is obtained from the reaction of carbon tetrachloride and paraxylene.

The reaction is carried out in accordance with the invention at an elevated temperature of at least 270° C. and preferably at least 300° C. As the temperature is increased, the reaction rate increases. At too high a temperature, the output is characterized by too much undesirable by-products. Therefore a maximum temperature of about 400° to about 450°C. is preferred. The preferred temperature range is about 325° to about 400° C. A reaction initiator such as an organic peroxide or electromagnetic radiation is not required.

The reaction of carbon tetrachloride and a polymethylbenzene results in the monochlorinated starting material, for example, $\alpha$-chloro para xylene. As the reaction time and/or reaction temperature increases, the production of side products tends to increase as a result, it is believed, of reactions involving the $\alpha$-chloro paraxylene. At long reaction time and/or higher reaction temperatures, the major product can be a polymethylbenzene polymer. An example of this is the polymer obtained when paraxylene and carbon tetrachloride were reacted at 400° C. for 13 minutes. Side products of the general reactions discussed above are chloroform, dichloro derivatives such as $\beta\beta'$-dichloro paraxylene, dimers of the starting material, for instance, diparaxyllyl in the case of paraxylene etc., as well as some highly corrosive materials, such as HCl.

In view of the corrosive effects of the reaction conditions, it is preferred to use a construction material for the process equipment which resists corrosion in the present reaction environment, such as glass, nickel, a noble metal, etc. When glass lined reactors are used, a high selectivity is observed, a selectivity approaching 100 percent.

The reaction can be carried out over a broad range of mol ratios of polymethylbenzenes to carbon tetrachloride such as a range from about 20 to about 0.1. It is preferred to use mol ratios of paraxylene to carbon tetrachloride within the range of about 5 to about 1 for satisfactory operation. The reaction can in most instances be conveniently carried out in either a batch or a continuous operation. The batch reaction can be conveniently carried out at autogeneous pressure.

The invention is now described by way of specific examples, however, they are not to be construed in any manner as limiting the invention.

EXAMPLE 1

A mixture was prepared of 279.8 cc. of carbon tetrachloride and 720.2 cc. of paraxylene. A 5 ml. portion of the mixture was placed in a glass tube with a total volume of 7.5 ml. and was then degassed prior to sealing the tube. The glass was next placed in a stainless steel pipe along with sufficient paraxylene to counterbalance the anticipated pressure within the glass. The system was placed in a constant temperature bath of 270° C. for a period of two hours. A yield of $\alpha$-chloroparaxylene of 15 percent, based on the initial concentration of carbon tetrachloride, was observed. The selectivity of the reaction products to $\alpha$-chloroparaxylene was 86 percent. The side product was primarily the dimer of paraxylene.

EXAMPLE 2

The procedures of example 1 were repeated except that a temperature of 285° C. was maintained for a period of 4 hours. The yield of $\alpha$-chloroparaxylene was 35 percent at a selectivity of 89 percent.

EXAMPLE 3

The procedures of example 1 were repeated except that a temperature of 310° C. was maintained for 1 hour. The yield of $\alpha$-chloroparaxylene was 33 percent at a selectivity of 89 percent.

EXAMPLE 4

The procedures of example 1 were repeated except that a temperature of 350° C. was maintained for a period of 16 minutes. The yield of $\alpha$-chloroparaxylene was 58 percent at a selectivity of 89 percent.

In like manner, $\alpha$-chloromesitylene is prepared from mesitylene; $\alpha$chloropseudocumene is prepared from pseudocumene; $\alpha$-chlorodurene is prepared from durene; $\alpha$-chloropentamethyl benzene is prepared from pentamethyl benzene; $\alpha$-chlorohexamethyl benzene is prepared from hexamethyl benzene.

It is to be understood that the above disclosure is by way of specific example and that numerous modifications and variations are available to those of ordinary skill in the art without departing from the true spirit of the invention.

We claim:

1. The process of reacting carbon tetrachloride and paraxylene which comprises contacting carbon tetrachloride and said paraxylene at a mol ratio of paraxylene to carbon tetrachloride of between about 5 and about 1, at a temperature of at least 270° up to about 450° C. and at autogenous pressure in the absence of a reaction initiator and recovering mono $\alpha$-chloroparaxylene.

2. A process in accordance with claim 1 in which the temperature is between about 325° and 400° C.

* * * * *